(12) United States Patent
Miyazaki et al.

(10) Patent No.: US 11,047,171 B2
(45) Date of Patent: Jun. 29, 2021

(54) ELECTROCHROMIC DEVICE, AND LENS UNIT, IMAGING APPARATUS AND WINDOW INCLUDING THE ELECTROCHROMIC DEVICE

(71) Applicant: CANON KABUSHIKI KAISHA, Tokyo (JP)

(72) Inventors: Kazuya Miyazaki, Kunitachi (JP); Kentaro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 16/258,290

(22) Filed: Jan. 25, 2019

(65) Prior Publication Data

US 2019/0242183 A1 Aug. 8, 2019

(30) Foreign Application Priority Data

Feb. 2, 2018 (JP) .............................. JP2018-017376

(51) Int. Cl.
*E06B 9/24* (2006.01)
*G02F 1/1516* (2019.01)
*G02F 1/163* (2006.01)
*G02F 1/155* (2006.01)
*G02F 1/157* (2006.01)
*E06B 3/67* (2006.01)
*G02F 1/1514* (2019.01)
*G02F 1/153* (2006.01)

(52) U.S. Cl.
CPC .............. *E06B 9/24* (2013.01); *E06B 3/6722* (2013.01); *G02F 1/155* (2013.01); *G02F 1/157* (2013.01); *G02F 1/15165* (2019.01); *G02F 1/163* (2013.01); *E06B 2009/2464* (2013.01); *G02F 1/153* (2013.01); *G02F 2001/15145* (2019.01)

(58) Field of Classification Search
CPC .......... G02F 1/163; G02F 1/155; G02F 1/157; G02F 1/15165; G02F 1/153; G02F 2001/15145; E06B 9/24; E06B 3/6722; E06B 2009/2464
USPC .................................................. 359/265–275
See application file for complete search history.

(56) References Cited

U.S. PATENT DOCUMENTS 6,407,847 B1 * 6/2002 Poll ......................... E06B 3/66
359/275
2001/0042855 A1 11/2001 Tonar
2003/0214695 A1 * 11/2003 Abramson ................ G02F 1/15
359/265
2020/0228693 A1 * 7/2020 Ishida .................... H04N 5/238

* cited by examiner

*Primary Examiner* — Tuyen Tra
(74) *Attorney, Agent, or Firm* — Canon U.S.A., Inc. IP Division

(57) ABSTRACT

An easily operable dimming device includes a dimming element operable to control the transmittance thereof for light, and a first notification device operable to make a notification of a piece of information on a change in transmittance of the dimming section.

29 Claims, 5 Drawing Sheets

ELECTROCHROMIC DEVICE, AND LENS UNIT, IMAGING APPARATUS AND WINDOW INCLUDING THE ELECTROCHROMIC DEVICE

BACKGROUND

Field of the Disclosure

The present disclosure generally relates to an electrochromic device, and a lens unit, an imaging apparatus and a window that include the electrochromic device.

Description of the Related Art

An electrochromic element includes a pair of electrodes and an electrochromic layer between the pair of electrodes, and the light transmittance thereof is varied by an electrical oxidation-reduction reaction of a compound contained therein.

Electrochromic elements are being increasingly used in a variety of devices and, for example, in car anti-glare mirrors and airplane windows. As electrochromic elements become widespread, easier operation thereof is desired.

The response time of an electrochromic element is affected by the speed of electron transfer and diffusion due to an electrochemical reaction in the electrochromic element. Accordingly, it is difficult for electrochromic elements to exhibit a quick response within a specific time. In addition, in organic electrochromic elements, whose electrochromic layer contains an organic compound, a defective phenomenon occurs in the colored state when the element is colored over a long time.

US 2001/0042855 (hereinafter referred to as PTL 1) discloses an electrochromic element in which the electrochromic layer between a pair of electrodes contains a polymer matrix in addition to an electrochromic compound. According to PTL 1, this electrochromic layer is maintained stable. The polymer matrix makes the colored electrochromic compound difficult to physically transfer.

Although quick response is desirable in coloring/discoloring reaction of electrochromic elements, significant improvement in response time is difficult. Response time depends on electron transfer and diffusion. If the electrochromic layer is maintained stable by a polymer matrix as disclosed in PTL 1, the response becomes still slower. Consequently, when an electrochromic device undergoes a coloring operation, it is difficult to determine whether the coloring reaction of the electrochromic device is completed after the coloring operation. Accordingly, it is impossible to determine whether or not an additional operation is desired.

SUMMARY

The present disclosure provides an easily operable electrochromic device that includes a notification device operable to make a notification that a change in transmittance of the electrochromic element has reached an end.

According to one or more aspects of the present disclosure, an electrochromic layer includes an electrochromic element that includes a pair of electrodes and an electrochromic layer between the pair of electrodes, and a notification device operable to make a notification that a change in transmittance of the electrochromic element has reached an end.

Further features of the present disclosure will become apparent from the following description of exemplary embodiments with reference to the attached drawings.

DESCRIPTION OF THE EMBODIMENTS

Figure 1:
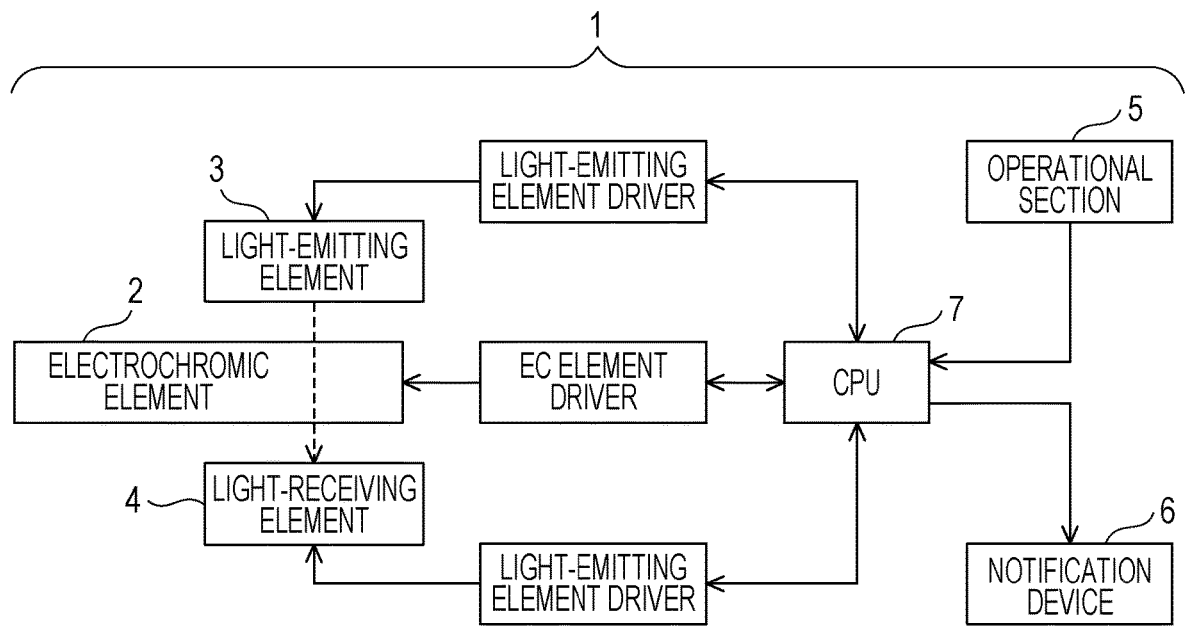
FIG. 1 is a block diagram of an electrochromic device according to a first embodiment of the present disclosure.

Various exemplary embodiments, features, and aspects of the present disclosure are described in detail below with reference to the accompanying drawings.

An electrochromic device (hereinafter referred to as EC device in some cases) according to an embodiment of the present disclosure includes a notification device operable to make a notification that a change in transmittance of an electrochromic element (hereinafter referred to as EC element in some cases) has reached an end. The user of the EC device can be easily notified that the change in transmittance of the EC element has reached an end. Accordingly, if the transmittance does not reach a desired level, the user can realize that an additional operation is needed. In particular, the notification may be useful in the case where the transmittance of the EC element varies at a low rate. The phrase "a change in transmittance reaches an end" means that the transmittance of an EC element reaches a value specified by the user, not meaning that it reaches a minimum or a maximum transmittance.

The EC device according to an embodiment of the present disclosure may include a notification light-emitting portion operable to light up or blink to notify the user that a change in transmittance of the EC element has reached an end. The notification light-emitting portion may be used to indicate the state of transmittance setting. In this instance, the notification of the end of the change may be made by a blinking of the notification light-emitting portion. How much the change in transmittance has proceeded toward the end may be indicated by varying blinking intervals. How much the change has proceeded may be represented by the percentage of the present transmittance relative to a target transmittance. For example, as the transmittance becomes closer to a target transmittance, the light-emitting portion may blink faster. The notification light-emitting portion may be integrated with the EC device in one body, may be embedded in a wall or the like having a window, or may be a separate member connected to the EC device by wire or wirelessly. The size of the separate member is not particularly limited but may be portable. The light-emitting device of the light-emitting portion may be, but is not limited to, a light emitting diode (LED), an organic LED (OLED), or an incandescent lamp.

In an embodiment, the EC device may include a sound source, such as a speaker. A sound from the sound source may notify the user that the change in transmittance of the EC element has reached an end. In this instance, the sound may be a simple buzzing sound or a melody, or a language telling the user the end of the change. The language may be any language.

In an embodiment, the EC device may include a vibrator. A vibration of the vibrator may notify the user that the change in transmittance of the EC element has reached an end. The vibrator may be integrated with the EC device in one body, may be embedded in a wall or the like having a window, or may be a separate member connected to the EC device by wire or wirelessly. The size of the separate member is not particularly limited but may be portable.

In an embodiment, the EC device may include a communication device operable to communicate with an external device. The connection for the communication may be made, but is not limited to, Wi-Fi, Bluetooth (registered trademark), or any other known communication technology. The communication device is connected to a receiving member for communication. The receiving member may notify the user that the change of transmittance of the EC element has reached an end by emitting light or generating a sound or a vibration.

As described above, the EC device of the present disclosure may notify the user that the change in transmittance of the EC element has reached an end point by a variety of ways.

In an embodiment, the EC device may include a detector operable to detect the end of the change in transmittance. This detection may be made by, but is not limited to, measuring the transmittance of the EC element, measuring the period of time from the start of the change in transmittance, or measuring the current flowing in a circuit connected to the EC element.

In an embodiment, the EC device may include a light-emitting portion and a light-receiving element operable to receive the light emitted from the light-emitting portion so as to measure the transmittance of the EC element. The light-emitting portion and the light-receiving element may be disposed with the EC element therebetween. The light-emitting portion may include a light-emitting element. The light-emitting element may be a LED, an OLED, an optical fiber, or the like.

The transmittance of the EC element can be determined by measuring the intensity or the amount of the light emitted from the light-emitting portion and received by the light-receiving element. According to the result of this measurement, the notification device notifies the user that the transmittance of the EC element has reached a transmittance specified by the user. Measuring the transmittance of the EC element is beneficial in terms of accuracy.

In an embodiment, EC device may include a time measurement section operable to measure the period of time from the start of the change in transmittance for estimation of the transmittance of the EC element. The EC device may include a calculation section operable to estimate the period of time until the change in transmittance reaches the end. When the period of time measured by the measurement section reaches the estimated period of time, it may be assumed that the change in transmittance of the EC element has reached the end. When the measured period has reached the estimated period, the notification device notifies the user that the transmittance of the EC element has reached a transmittance specified by the user.

Measuring the period of time does not involve any additional member or component and is thus simpler than measuring the transmittance of the EC element.

In an embodiment, the EC device may include a detector operable to detect a current flowing in a circuit connected to the EC element. Since the optical density of the EC element depends on the current flowing in the element, the point at which a change in current of the element seems to be saturated can be considered to be the end point of the change in transmittance.

First Embodiment

FIG. 1 is a schematic diagram of an EC device according to a first embodiment of the present disclosure. The EC device 1 includes an EC element 2, a light emitting element 3, a light-receiving element 4, an operational section 5, a first notification device 6, and a central processing unit (CPU) 7.

In the EC device of the present embodiment, a user operates the operational section 5 to start changing transmittance to a predetermined transmittance value. The transmittance may be changed by, for example, varying the voltage applied to the EC element, varying the duty ratio at a specific voltage, or by a combination thereof.

The EC device of the present embodiment includes the light-emitting element 3 and the light-receiving element 4 so as to detect a piece of information on the transmittance of the EC element while changing the transmittance. The light-emitting element 3 emits a light ray having a specific wavelength at a specific intensity. The light-receiving element 4 is operable at least to absorb light having the specific wavelength. The light-receiving element 4 receives the light emitted from the light-emitting element 3 and having passed through the EC element 2.

The transmittance of the EC element is estimated from the intensity or the amount of light received by the light-receiving element. When the estimated transmittance has reached the transmittance specified by the user, the notification device notifies the user, and when it has not reached, changing the transmittance is continued without notifying the user.

In the case of using a notification light-emitting portion as the notification device, it is beneficial that the EC device be designed so that the light emitted from the notification light-emitting portion does not reach the light-receiving element 4. For example, the notification light-emitting portion may be disposed so that the light therefrom does not enter the EC element and travels in another direction, or a light shield may be provided for the EC element.

Second Embodiment

Figure 2:
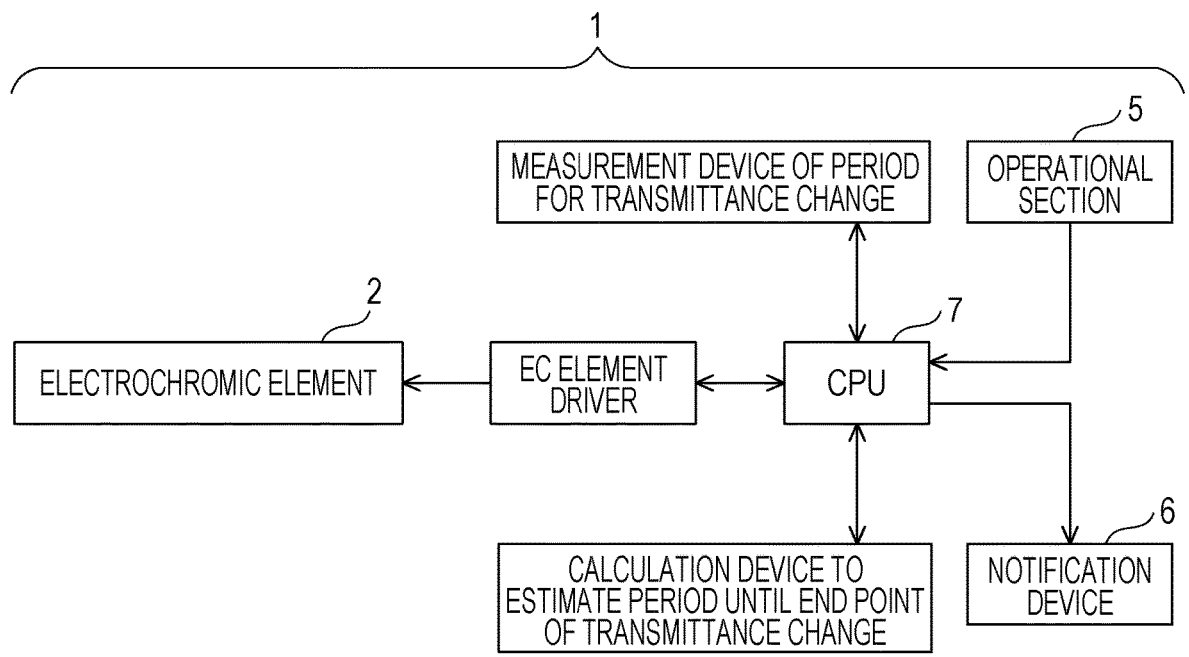
FIG. 2 is a block diagram of an electrochromic device according to a second embodiment of the present disclosure.

FIG. 2 is a schematic diagram of an EC device according to a second embodiment of the present disclosure. The EC device of the second embodiment has the same configuration as in the first embodiment except that the notification of the end of the change in transmittance is made by measuring a period of time from the start of the change in transmittance without using the light-emitting element or the light-receiving element. The same elements or members are designated by the same reference numerals.

The EC element of the present embodiment includes a measurement device operable to measure the period of time from the start of the change in transmittance and a calculation device operable to estimate the period of time until the change in transmittance reaches the end.

The measurement device may measure the period of time from when the user gives an instruction to start changing the transmittance. The measurement device may measure a continuous time from the start of the change in transmittance or measure a period between the time at which a change in transmittance has started and the time at which the change has reached an end by recording these times.

The calculation device estimates the period until the change in transmittance reaches the end. The estimated period may be calculated from the current applied to the EC element or based on time. Changes in transmittance with time may be recorded in advance, and the estimated period may be calculated with reference to the record.

When the period of time measured by the measurement device has reached the estimated period, the notification device notifies the user of the end of the change in transmittance of the EC element.

Figure 3:
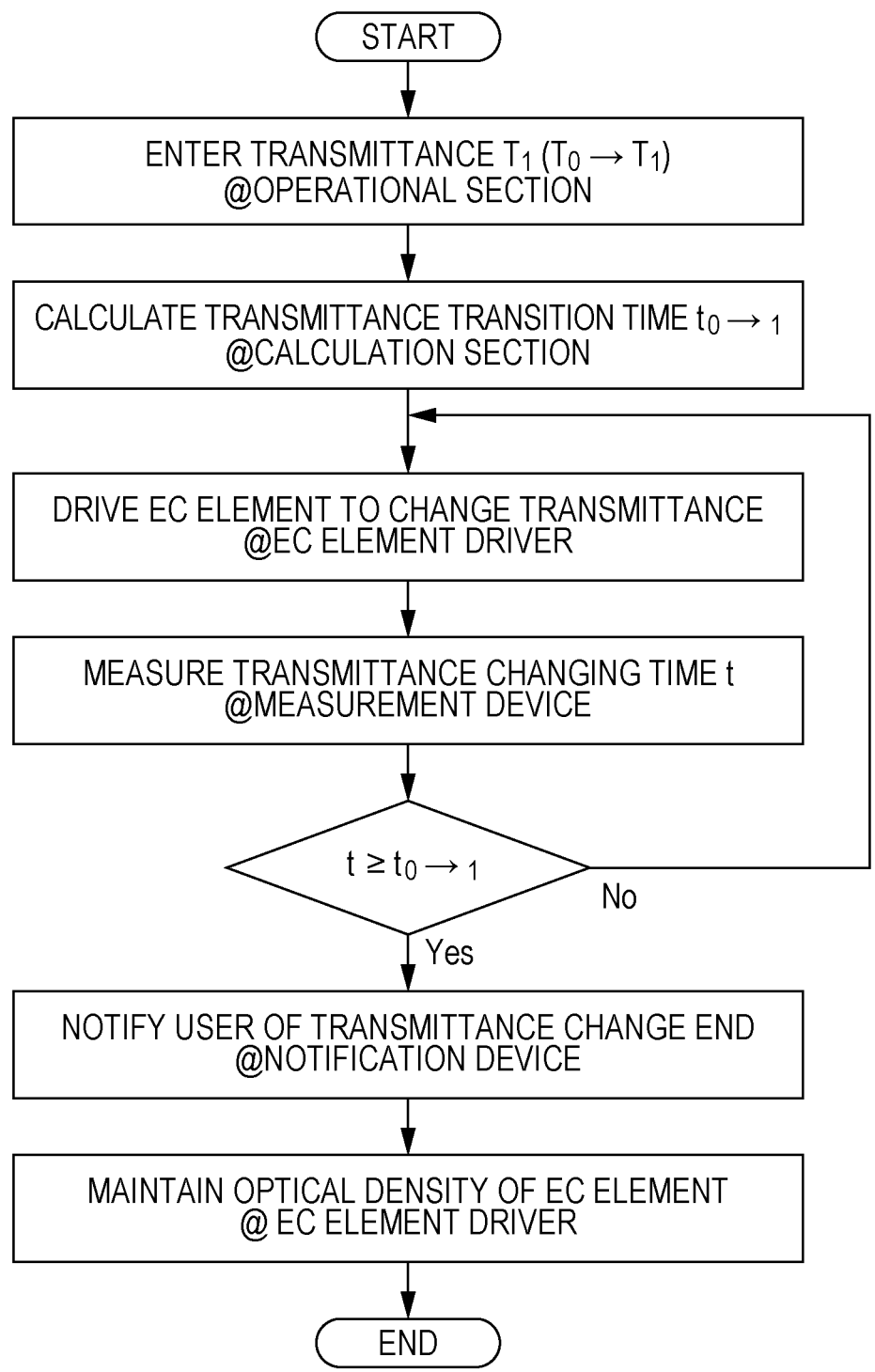
FIG. 3 is a flow chart illustrating a process of an electrochromic device of the second embodiment from the start of a change in transmittance of the EC element to a notification of the end of the change in transmittance.

FIG. 3 is a flow chart illustrating a process of the electrochromic device of the present embodiment from the start of a change in transmittance to the notification of the end of the change.

In the first step in the flow chart, a target transmittance of the EC element is entered by operating the operational section. When the transmittance is changed from an initial transmittance $T_0$ to a target transmittance $T_1$, $T_1$ is entered. The initial transmittance is not the value when the EC device is electrified nor the factory default value, but the transmittance when the operational section is operated.

Next, the calculation section calculates the transition time of the transmittance, that is, the period of time to change the initial transmittance to the entered value or target transmittance. For this calculation, the constituents in the EC element may be taken into account. For example, what solvent or what electrochromic compound is used is taken into account.

Next, the EC element is driven to change the transmittance. For example, a voltage may be applied to the EC element to a potential at which an oxidation-reduction reaction occurs, or, in the case of pulse-width modulation, the pulse width may be modulated so that the transmittance of the EC element can change.

Next, the transmittance changing time t that is the period of time during which the transmittance is changing is measured. This step may be started simultaneously with the foregoing step. The transmittance changing time can be referred to as the period of time during which the EC element is being driven.

Next, the transmittance changing time measured in the foregoing step is compared with the transition time of the transmittance calculated by the calculation section. If the transmittance changing time is longer than or equal to the transition time, the change in transmittance of the EC element is stopped. If the transmittance changing time is shorter than the transition time, the process returns to the step of changing the transmittance of the EC element and loops to the step of comparing the transmittance changing time with the transition time of the transmittance.

Next, the first notification device notifies the user that the change in transmittance of the EC element has reached the end.

Next, the voltage or current applied to the EC element is controlled so that the optical density can be maintained, that is, so that the transmittance does not vary. If the transmittance of the EC element increases spontaneously due to self-discoloration, this step is beneficial. In contrast, if the EC element has a memory effect in transmittance, this step is not needed.

That is a flow of making a notification of the end of a change based on time measurement. The process for the notification may include a further step not shown in the flow chart in the figure unless departing from the scope and spirit of the invention.

Third Embodiment

Figure 4:
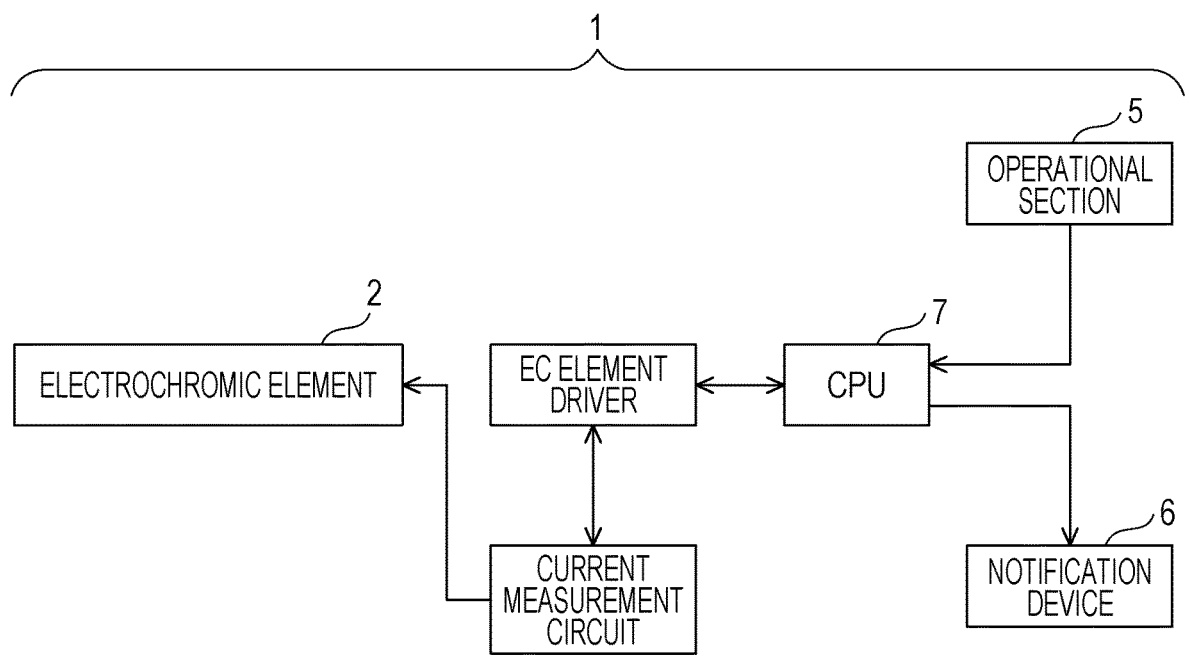
FIG. 4 is a block diagram of an electrochromic device according to a third embodiment of the present disclosure.

FIG. 4 is a schematic diagram of an EC device according to a third embodiment of the present disclosure. The EC device of the third embodiment has the same configuration as in the first embodiment except that the end of change in transmittance is detected by estimating the transmittance of the EC element from the current flowing in the EC element without using the light-emitting element nor the light-receiving element. The same elements or members are designated by the same reference numerals.

The EC device of the present embodiment includes an EC element driver including a current measurement circuit.

The amount of reacted electrochromic compound may be estimated from the charge measured, or the end of the change of transmittance may be estimated from changes in current.

When the estimated transmittance of the EC element has reached the transmittance specified by the user, the notification device notifies the user of the end of the change in transmittance.

EC Element

Figure 5:
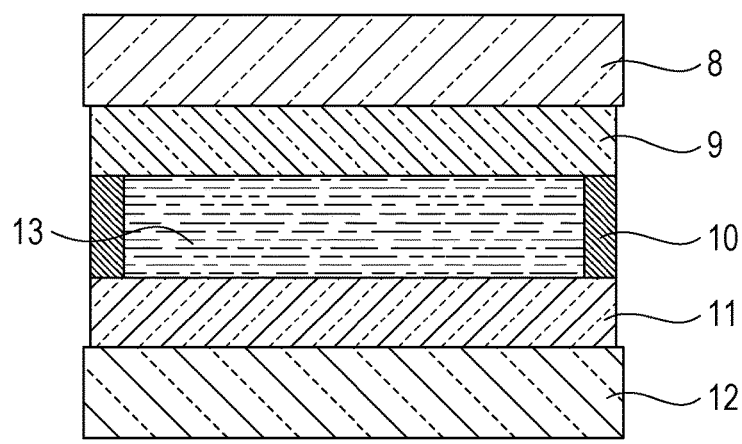
FIG. 5 is a schematic sectional view of an electrochromic element according to an embodiment of the present disclosure.

In an embodiment, the EC element includes a pair of transparent substrates, a pair of electrodes, an electrochromic layer (hereinafter referred to as EC layer in some cases) disposed between the pair of electrodes. FIG. 5 is a schematic sectional view of an EC element according to an embodiment of the present embodiment. The EC element includes a pair of transparent substrates 8 and 12, a pair of transparent electrodes 9 and 11, a sealing member 10, and an EC layer 13. The distance between the pair of transparent electrodes may be fixed by the sealing member. The sealing member can be referred to as a spacer. The EC layer contains an electrochromic compound and is disposed in a space defined by the pair of transparent electrodes and the sealing member. The EC layer may be a solid layer formed by, for example, deposition or a liquid layer of an EC compound dissolved in an electrolyte solution. In at least some embodiments, the EC layer may be a liquid layer.

The EC compound may be an organic compound or an inorganic compound. The EC compound may be an anodic electrochromic compound that is changed from a transparent state to a colored state by an oxidation reaction, or a cathodic electrochromic compound that is changed from a transparent state to a colored state by a reduction reaction. Both of an anodic EC compound and a cathodic EC compound may be used. In particular, in the case of using organic compounds as the EC compound, a combined use of an anodic EC compound and a cathodic EC compound increases current efficiency.

In the description hereinafter, an EC element using both an anodic compound and a cathodic compound is referred to as a complementary EC element, and an EC element using either an anodic compound or a cathodic compound is referred to as a monopolar EC element. Anodic EC compounds may be referred to as anodic materials, and cathodic compounds may be referred to as cathodic materials.

When a complementary EC element is driven, electrons are extracted from one of the electrodes by an oxidation reaction, while the EC compound in the other electrode receives the electrons by a reduction reaction. The oxidation reaction may produce radical cations from neutral molecules. The reduction reaction may produce radical anions from neutral molecules or produce radical cations from dicationic molecules. Thus, in complementary EC elements, the EC compounds are each colored at either electrode. This is beneficial in the case of a high optical density and a low transmittance when the EC element is colored.

On the other hand, monopolar EC elements consume less power than complementary EC elements. Complementary EC elements need a large current to maintain a colored state. In complementary EC elements, the radical cations of the anodic EC compound and the radical cations of the cathodic EC compound disperse in the solution and collide with each other, thus inducing an oxidation-reduction reaction, discoloring the EC element. In order to maintain a colored state, a coloring reaction is continued at a higher level than the discoloring reaction.

In the case of using inorganic compounds as the EC compound, an electrolyte layer may be provided between the EC layer and at least one of the pair of electrodes. In the case of using organic compounds, an electrolyte layer may be provided in the same manner as in the case of using inorganic compounds, or an electrolyte solution may be used with the organic compound.

Exemplary organic EC compounds include electroconductive polymers, such as polythiophene and polyaniline; and low-molecular-weight organic compounds, such as viologen-based compounds, anthraquinone-based compounds, oligothiophene derivatives, and phenazine derivatives. Exemplary inorganic EC compounds include metal oxides, such as NiOx and $WO_3$.

The EC layer may have a multilayer structure including an electrolyte layer containing an electrolyte and a layer containing an EC compound. The EC layer may contain only one EC compound or a plurality of EC compounds.

In the EC layer containing a plurality of EC compounds, it is beneficial that the oxidation-reduction potentials of the EC compounds have small differences therebetween. The EC layer containing a plurality of EC compound may contain four or more EC compounds including both an anodic compound and a cathodic compound. In an embodiment, the EC element may contain five or more EC compounds.

For the EC layer containing a plurality of EC compounds, the oxidation-reduction potential of the anodic materials may be within 60 mV, and the oxidation-reduction potential of the cathodic materials may be within 60 mV.

The plurality of EC compounds include a compound having an absorption peak in the range of wavelength of 400 nm to 500 nm, a compound having an absorption peak in the range of wavelength of 500 nm to 650 nm, and a compound having an absorption peak at a wavelength of 650 nm or more. The term absorption peak used herein refers to a peak having a half width (full width at half maximum) of 20 nm or more. The compound about to absorb light is in an oxidized state, in a reduced state, or in a neutral state.

The members or components of the EC element according to an embodiment of the present disclosure will now be described.

The electrolyte is an ionically dissociable salt that is soluble in solvent or, in the case of a solid electrolyte, is compatible with solvent and is not otherwise limited. An electron-donating electrolyte is beneficial. The electrolyte used in the EC element can be referred to as a supporting electrolyte.

Examples of the electrolyte include inorganic salts such as alkali metal salts and alkaline-earth metal salts, quaternary ammonium salts, and cyclic quaternary ammonium salts.

More specifically, examples of the electrolyte include alkali metal (Li, Na, or K) salts, such as $LiClO_4$, LiSCN, $LiBF_4$, $LiAsF_6$, $LiCF_3SO_3$, $LiPF_6$, LiI, NaI, NaSCN, $NaClO_4$, $NaBF_4$, $NaAsF_6$, KSCN, and KCl; and quaternary ammonium salts and cyclic quaternary ammonium salts, such as $(CH_3)_4NBF_4$, $(C_2H_5)_4NBF_4$, $(n\text{-}C_4H_9)_4NBF_4$, $(n\text{-}C_4H_9)_4NPF_6$, $(C_2H_5)_4NBr$, $(C_2H_5)_4NClO_4$, and $(n\text{-}C_4H_9)_4NClO_4$.

The solvent capable of dissolving the EC compound and the electrolyte is not particularly limited provided that it can dissolve the EC compound and the electrolyte. For example, a polar solvent may be used.

Examples of the solvent include water and organic polar solvents, such as methanol, ethanol, propylene carbonate, ethylene carbonate, dimethyl sulfoxide, dimethoxyethane, γ-butyrolactone, γ-valerolactone, sulfolane, dimethylformamide, tetrahydrofuran, acetonitrile, propionitrile, 3-methoxypropionitrile, benzonitrile, dimethylacetamide, methylpyrrolidinone, and dioxolane.

The EC layer may further contain a polymer matrix or a gelling agent. In this instance, the viscosity of the EC layer increases, and, in a case, the EC layer may gel.

Examples of the polymer matrix include polyacrylonitrile, carboxymethyl cellulose, pullulan-based polymer, polyvinyl chloride, polyethylene oxide, polypropylene oxide, polyurethane, polyacrylate, polymethacrylate, polyamide, polyacrylamide, polyester, and nafion (registered trademark). In at least some embodiments, polymethyl methacrylate (PMMA) may be used.

The transparent substrates and the transparent electrodes will now be described. The transparent substrates may be made of, for example, colorless or colored glass or tempered glass. An optical glass, such as Corning #7059 or BK-7, may be used as the glass of the substrates. A plastic or a ceramic may be used, if necessary, provided that it is sufficiently transparent.

The transparent substrates may be made of a rigid material less susceptible to distortion. The phrase "being transparent" implies that the material has a transmittance of 50% or more for visible light.

Examples of the plastic and the ceramic include polyethylene terephthalate, polyethylene naphthalate, polynorbornene, polyimide, polysulfone, polyethersulfone, polyether ether ketone, polyphenylene sulfide, polycarbonate, polyimide, and polymethyl methacrylate.

Examples of the material of the electrodes include metals and metal oxides, such as indium tin oxide (ITO), fluorine-doped tin oxide (FTO), tin oxide (NESA), indium zinc oxide (IZO), silver oxide, vanadium oxide, molybdenum oxide, silver, platinum, copper, indium, and chromium; silicon materials, such as polycrystalline silicon and amorphous silicon; and carbon materials, such as carbon black, graphite, and glassy carbon.

There may be used electroconductive polymer whose conductivity is increased by doping, such as polyaniline, polypyrrole, polythiophene, polyacetylene, poly(para-phenylene), or a polyethylenedioxythiophene-polystyrenesulfonic acid complex (PEDOT:PSS).

In an embodiment of the present disclosure, the EC element may have a high transmittance in a discolored state. In this instance, the transparent electrode may be made of ITO, IZO, NESA, PEDOT:PSS, or graphene. These materials may be used in a variety of states, such as in bulk or fine particles. These electrode materials may be used singly or in combination.

The sealing member may be made of a chemically stable material that is not permeable to gas or liquid and does not inhibit the oxidation-reduction reaction of the EC compound. The material of the sealing member may be, for example, an inorganic material, such as glass frit, an organic material, such as epoxy resin, or a metal.

In an embodiment, the EC element may include a spacer. The spacer fixes the distance between the electrodes. The sealing member may function as the spacer.

The spacer may be made of an inorganic material, such as silica beads or glass fiber, or an organic material, such as polydivinylbenzene, polyimide, polytetrafluoroethylene, fluorocarbon rubber, or epoxy resin.

Imaging Apparatus

The EC element according to an embodiment may be used in an imaging apparatus. The imaging apparatus may be, for example, a digital still camera, a video camera, a smartphone, or a tablet computer. The imaging apparatus includes an imaging optical section having a plurality of lenses, an EC device, and an imaging element operable to receive light that has passed through the EC device. The EC device may be disposed between the lenses and the imaging element, or one or some of the lenses may be disposed between the EC device and the imaging element. In at least some embodiments, the EC device may be disposed immediately in front of the imaging element. The phrase "immediately in front of the imaging element" implies that no lens is disposed between the EC device and the imaging element. The optical section may be handled independently of the imaging apparatus. In this instance, the optical section may be referred to as a lens unit. The lens unit may include the EC device according to an embodiment of the present disclosure.

The imaging apparatus may have a function to control the relative positions of the lenses to automatically focus on the subject, and such an imaging apparatus may include a second notification device operable to make a notification that the imaging apparatus has completed the automatic focusing. The function to focus on the subject may be referred to as the function to control the relative positions of the plurality of lenses.

When the imaging apparatus has both the notification device operable to make a notification that a change in transmittance of the EC element has reached an end and the notification device operable to make a notification that the EC device has focused on the subject, the notification of the end of change in transmittance may precede the notification of the completion of focusing, or vice versa. Also, both of the notification of the end of the change and the notification of the completion of automatic focusing may be made. Hence, in the imaging apparatus, the notification that the change in transmittance of the EC element has reached the end and the notification that automatic focusing has been completed may be made independently or in combination. For example, by varying the way of notification, the user may be notified of different pieces of information on the imaging apparatus.

For example, a first sound may notify the user that the change in transmittance of the EC element has reached the end, and a second sound may notify the user that automatic focusing has been completed.

The imaging apparatus may notify the user of the end of the change and the completion of the control by using a sound. In this instance, the notification of these pieces of information on the apparatus may be made by varying the pitch, the melody, the rhyme, or the like of the sound.

The imaging apparatus may notify the user of the end of the change and the completion of the control by light emission. In this instance, the notification of these pieces of information on the apparatus may be made by varying the blink pattern, the emission color, the emission point, or the like.

The imaging apparatus may notify the user of the end of the change and the completion of the control by vibration. In this instance, the notification of these pieces of information may be made by varying the intensity, the rhyme, the position, or the like of the vibration.

The first notification device and the second notification device of the imaging apparatus may be independent of each other or combined, thus notifying the user of respective notifications independently or simultaneously. A plurality of notification devices may be used to make notifications of some pieces of information on the apparatus. If the notifications by the two notification devices are combined, the second notification device may precede the other device. This means that the notification by the second notification device is made before the notification by the first notification device. When a user has received the notification by the second notification device, the user can image an object. The mode in which the notification by the second notification is precedent is suitable for imaging an object whose suitable imaging time is short. For example, this mode is suitable for imaging a natural phenomenon that appears for a short time. This mode can prevent the user from failing to image such a phenomenon during waiting for the notification from the first notification device. Alternatively, the notification of the first notification device may be precedent. This is suitable in the case where image quality has a higher priority. This mode is used in the case where it is suitable to image an object after receiving the notification by the first notification device, that is, after ensuring that the apparatus has come into condition to image an object.

Imaging or to image an object mentioned herein means that the imaging element receive light, but all the information on received light is not necessarily used. For example, only a difference from the image that has previously received light may be reflected in an image.

The imaging apparatus according to the present embodiment includes the first notification device and the second notification device that notify the user of respective pieces of information on the apparatus and is thus easily operable.

Figure 6A:
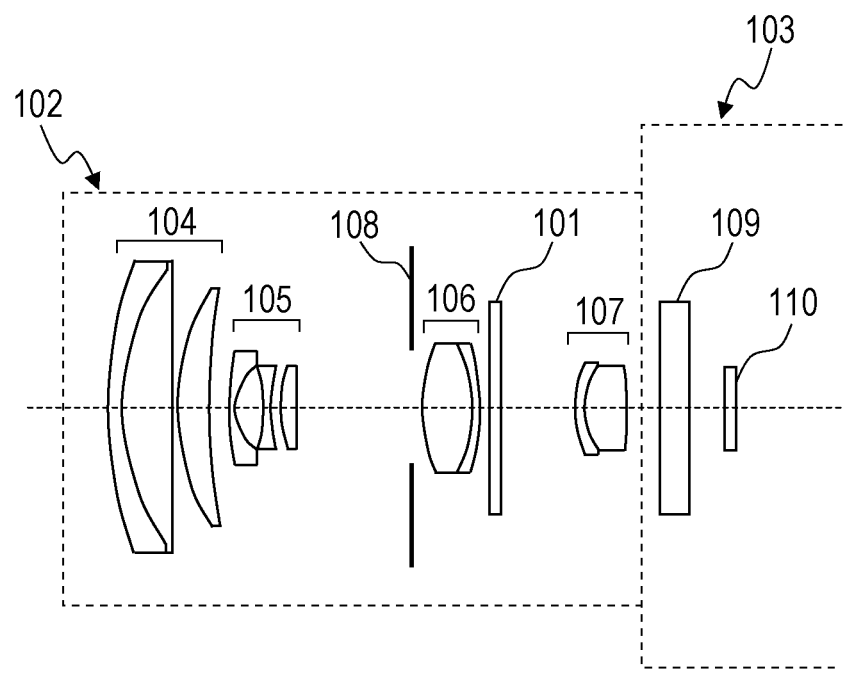
FIGS. 6A and 6B are each a schematic view of an imaging apparatus including the electrochromic device according to an embodiment of the present disclosure.
Figure 6B:
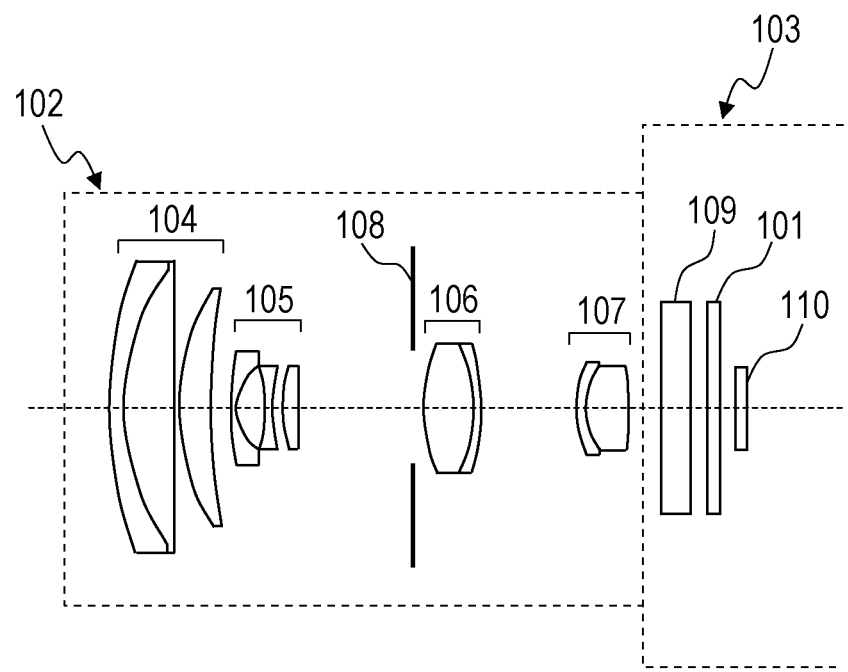

FIGS. 6A and 6B are each a schematic view of an imaging apparatus including the EC device according to an embodiment of the present disclosure. FIG. 6A is an imaging apparatus including a lens unit 102 including the EC device 101 according to an embodiment of the present disclosure, and FIG. 6B is an imaging apparatus including the EC device according to an embodiment of the present disclosure. The lens unit 102 shown in FIG. 6A is removably connected to an imaging unit 103 with a mount (not shown) therebetween.

The lens unit 102 includes a plurality of lenses or some sets of lenses. For example, the lens unit 102 shown in FIG. 6A is a rear focus zoom lens operable to bring the apparatus into focus behind the aperture. The lens unit 102 includes four lens sets: a first lens set 104 having a positive refractive power, a second lens set 105 having a negative refractive power, a third lens set 106 having a positive refractive power, and a fourth lens set 107 having a positive refractive power, arranged in this order from the subject side. The imaging apparatus is brought into focus by varying the distance between the second lens set 105 and the third lens set 106 to vary magnification and moving some the lenses of the fourth lens set 107. In the lens unit 102, for example, an aperture stop 108 is disposed between the second lens set 105 and the third lens set 106, and the EC device 101 is disposed between the third lens set 106 and the fourth lens set 107. The lens unit 102 is configured to allow light passing therethrough to pass through the lens sets 102 to 107, the aperture stop 108, and the EC device 101, and the amount of light is controlled by using the aperture stop 108 and the EC device 101.

The arrangement within the lens unit 102 may be modified as needed. For example, the EC device 101 may be disposed in front of the aperture stop 108 (on the object side), at the back of the aperture stop (on the imaging unit 103 side), in front of the first lens set 104, or at the back of the fourth lens set 107. By placing the EC device at a position on which light converges, the area of the EC device 101 can be reduced beneficially. The lens unit 102 may be of a type other than the rear focus type and may be, for example, of an inner focus type that brings the apparatus into focus in front of the aperture. Also, the lens unit 102 may act as a special lens such as a fisheye lens or a microlens, as well as the zoom lens.

The imaging apparatus 103 may has a glass block 109. The glass block 109 may be, for example, a low-pass filter, a face plate, or a color filter. The imaging element 110 is a sensor that receives light that has passed through the lens unit 102 and may be, for example, a CCD element or a CMOS element. Alternatively, the imaging element 110 may be a light sensor such as a photodiode, or any other element or device capable of receiving and outputting a piece of information, such as light intensity or wavelength.

In the case where the EC device 101 is incorporated in the lens unit 102, as shown in FIG. 6A, the EC element driver may be disposed within the lens unit 102 or outside the lens unit 102, for example, in the imaging unit 103. If the driver is disposed outside the lens unit 102, the EC device in the lens unit 102 and the driver outside the lens unit 102 are coupled to each other by wire for drive control.

The imaging unit 103 may include the EC device 101 according to an embodiment of the present disclosure, as shown in FIG. 6B. The EC device 101 is disposed at an appropriate position within the imaging unit 103 so that the imaging element 110 can receive light that has passed through the EC device 101 and is not otherwise limited. In the configuration shown in FIG. 6B, the EC device 101 is disposed immediately in front of the imaging element 110. In the case where the imaging unit 103 contains the EC device 101, since the lens unit 102 connected to the imaging unit does not necessarily include the EC device 101, the imaging apparatus may be an apparatus using a known lens unit and enabling dimming.

This type of imaging apparatus may be implemented in a product including a combination of a dimming device and an imaging element. Examples of such an imaging apparatus include cameras, such as a digital camera, a video camera, and a digital video camera; and other apparatuses including an imaging device therein, such as a cellular phone, a smartphone, a PC, and a tablet computer.

By using the EC device 101 as a dimming member, the amount of light to be modulated can be varied as needed with a single filter, thus reducing the number of members or components and saving space.

Production Process of EC Element

In a process for producing the EC element according to an embodiment of the present disclosure, the space between the pair of electrodes may be filled with a liquid containing EC compound prepared in advance, by vacuum injection, atmospheric injection, a meniscus method, or any other method. Each of the electrodes may be in the form of an electrode substrate defined by a substrate provided with an electrode thereon.

Window Including EC Device

Figure 7A:
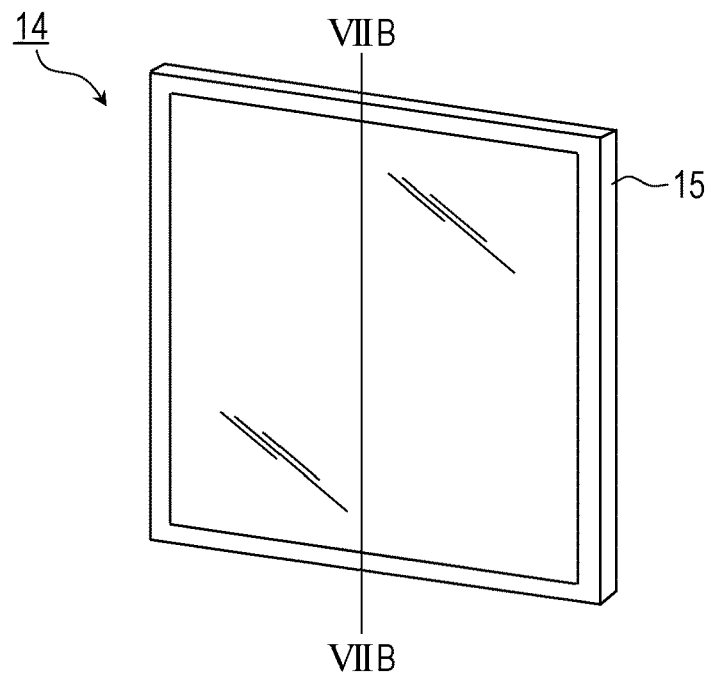
FIG. 7A is a schematic view of a window according to an embodiment of the present disclosure.
Figure 7B:
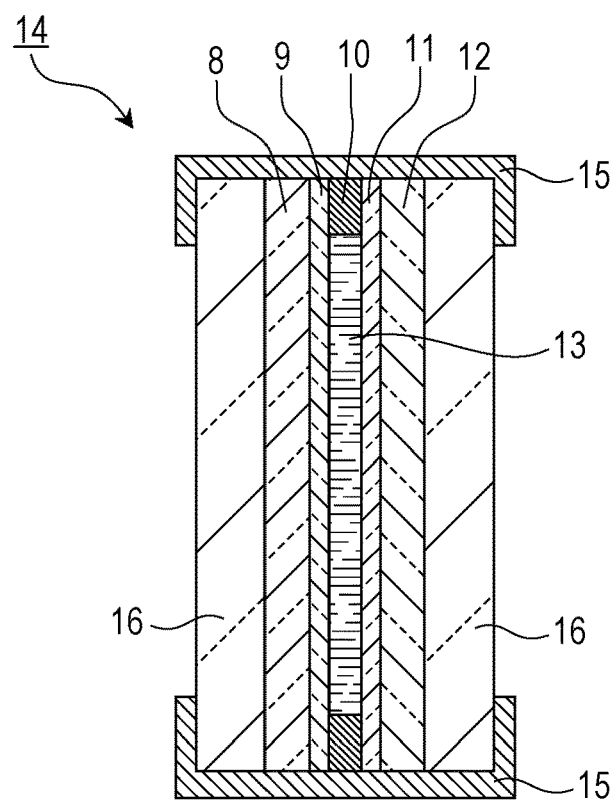
FIG. 7B is a sectional view of the window taken along line VIIB-VIIB in FIG. 7A.

The EC device according to an embodiment of the present disclosure may be used in a window. This window may be referred to as a dimming window. FIG. 7A is a schematic view of a window according to the present embodiment, and FIG. 7B is a sectional view of the window taken along line VIIB-VIIB in FIG. 7A. The same reference numerals as in FIG. 5 designate the same components or members.

The window 14 includes a pair of transparent plates 16, an EC device disposed between the pair of transparent plates, and a frame 15 functioning to surround the entirety of the window for integration. The driver(s) and operational section in the EC device are not shown in the figures.

At least either of the transparent substrates 8 and 12 of the window may be provided with a UV cut filter (not shown).

The transparent plates 16 are made of a material having a high light transmittance and are not otherwise limited. From the viewpoint of being used as a window, the transparent plates may be made of glass.

The window of the present embodiment is operable to control the amount of sunlight entering indoors. The window is also operable to control the amount of heat as well as the amount of sunlight and accordingly may be used to control indoor brightness and temperature. The window may be implemented as, for example, a glass window used in buildings or in vehicles, such as automobiles, trains, airplanes, and ships. Also, the window may be used to prevent someone from viewing a house's interior from the outside. In the case of using the window in a vehicle, the frame may be the body of the vehicle.

In the window of the present embodiment, the pair of transparent plates and the pair of transparent substrates are independent of each other. Alternatively, in an embodiment, the transparent substrates may double as the transparent plates.

As described above, the EC device of the present disclosure includes a notification device operable to make a notification that a change in transmittance of the EC element has reached an end. Accordingly, the EC element may be used as an easily operable dimming device that allows determination of whether or not an additional operation is needed according to the notification.

The present disclosure provides an easily operable electrochromic device that includes a notification device operable to make a notification that a change in transmittance of the electrochromic element has reached an end.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-017376 filed Feb. 2, 2018, which is hereby incorporated by reference herein in its entirety.

What is claimed is:

1. A dimming device comprising:
a dimming element operable to control a transmittance thereof for light, and a first notification device operable to make a notification of a piece of information on a change in transmittance of the dimming element,
wherein the piece of information is an end of the change in transmittance.

2. The dimming device according to claim 1, wherein the dimming element includes an electrochromic element including a pair of electrodes and an electrochromic layer between the pair of electrodes.

3. The dimming device according to claim 2, wherein the electrochromic layer contains a polymer matrix.

4. The dimming device according to claim 3, wherein the polymer matrix contains poly(methyl methacrylate).

5. The dimming device according to claim 2, wherein the electrochromic layer contains a plurality of electrochromic compounds including an anodic electrochromic compound and a cathodic electrochromic compound.

6. The dimming device according to claim 1, wherein the first notification device includes at least one device selected from the group consisting of a notification light-emitting portion, a sound source, a vibrator, and a communication device operable to communicate with an external device.

7. The dimming device according to claim 1, wherein the first notification device is connected to the dimming element by wire or wirelessly.

8. The dimming device according to claim 1, further comprising a detector operable to detect a piece of information on the transmittance of the dimming element.

9. The dimming device according to claim 8, wherein the detector is operable to measure the transmittance of the dimming element.

10. The dimming device according to claim 8, wherein the detector includes a light-emitting portion and a light-receiving element, the dimming element is disposed between the light-emitting portion and the light-receiving element, and the light-receiving element receives light emitted from the light-emitting portion and having passed through the dimming element.

11. The dimming device according to claim 1, further comprising a time measurement section operable to measure a period of time of the change in transmittance, and a calculation section operable to estimate a period of time until the change in transmittance reaches an end.

12. An imaging apparatus comprising:
an optical section including a plurality of lenses;
an imaging element operable to receive light that has passed through the optical section; and
the dimming device as set forth in claim 1, the dimming device being disposed between the optical section and the imaging element.

13. The imaging apparatus according to claim 12, further comprising a second notification device operable to control the relative positions of the plurality of lenses and make a notification that the control of the relative positions has been completed,
wherein the notification by the second notification device precedes the notification by the first notification device.

14. The imaging apparatus according to claim 13, wherein a combination of the first notification device and the second notification device makes a continuous notification of pieces of information on the imaging apparatus.

15. The imaging apparatus according to claim 12, further comprising a second notification device operable to control the relative positions of the plurality of lenses and make a notification that the control of the relative positions has been completed,
wherein the notification by the first notification device precedes the notification by the second notification device.

16. The imaging apparatus according to claim 12, further comprising a second notification device operable to control the relative positions of the plurality of lenses and make a notification that the control of the relative positions has been completed,
wherein the first notification device and the second notification device make the respective notifications at the same time.

17. A lens unit comprising:
an optical section including a plurality of lenses; and
the dimming device as set forth in claim 1, the dimming device being operable to control the amount of light that has passed through the optical section.

18. A window comprising:
a pair of transparent substrates; and
the dimming device as set forth in claim 1, the dimming device being disposed between the pair of transparent substrates.

19. The window according to claim 18, wherein at least one of the pair of transparent substrates has an ultraviolet light-cut filter.

20. A dimming device comprising:
a dimming element operable to control a transmittance thereof for light; and
a first notification device operable to make a notification of a piece of information on a change in transmittance of the dimming element,
wherein the first notification device includes at least one device selected from the group consisting of a notification light-emitting portion, a sound source, a vibrator, and a communication device operable to communicate with an external device.

21. The dimming device according to claim 20, wherein the dimming element includes an electrochromic element including a pair of electrodes and an electrochromic layer between the pair of electrodes.

22. An imaging apparatus comprising:
an optical section including a plurality of lenses;
an imaging element operable to receive light that has passed through the optical section; and
the dimming device as set forth in claim 20, the dimming device being disposed between the optical section and the imaging element.

23. A lens unit comprising:
an optical section including a plurality of lenses; and
the dimming device as set forth in claim 20, the dimming device being operable to control the amount of light that has passed through the optical section.

24. A window comprising:
a pair of transparent substrates; and
the dimming device as set forth in claim 20, the dimming device being disposed between the pair of transparent substrates.

25. A dimming device comprising:
a dimming element operable to control a transmittance thereof for light, and
a first notification device operable to make a notification of a piece of information on a change in transmittance of the dimming element,
wherein the dimming element includes an electrochromic element including a pair of electrodes and an electrochromic layer between the pair of electrodes, and wherein the electrochromic layer contains a plurality of electrochromic compounds including an anodic electrochromic compound and a cathodic electrochromic compound.

26. The dimming device according to claim 25, wherein the piece of information is an end of the change in transmittance.

27. An imaging apparatus comprising:
an optical section including a plurality of lenses;
an imaging element operable to receive light that has passed through the optical section; and
the dimming device as set forth in claim 25, the dimming device being disposed between the optical section and the imaging element.

28. A lens unit comprising:
an optical section including a plurality of lenses; and
the dimming device as set forth in claim 25, the dimming device being operable to control the amount of light that has passed through the optical section.

29. A window comprising:
a pair of transparent substrates; and
the dimming device as set forth in claim 25, the dimming device being disposed between the pair of transparent substrates.

\* \* \* \* \*